United States Patent [19]
Rybicki

[11] 3,932,059
[45] Jan. 13, 1976

[54] DROOP STOPS FOR HELICOPTER ROTOR HAVING ELASTOMERIC BEARINGS

[75] Inventor: Robert C. Rybicki, Trumbull, Conn.
[73] Assignee: United Technologies Corporation, Hartford, Conn.
[22] Filed: Jan. 10, 1975
[21] Appl. No.: 540,309

[52] U.S. Cl. .............................. 416/140; 416/141
[51] Int. Cl.² ......................................... B64C 27/38
[58] Field of Search ..................... 416/140, 141, 134

[56] References Cited
UNITED STATES PATENTS

| | | | |
|---|---|---|---|
| 3,501,250 | 3/1970 | Mosinskis | 416/140 |
| 3,533,713 | 10/1970 | Salmun | 416/140 |
| 3,679,322 | 7/1972 | Mouille | 416/141 |
| 3,778,189 | 12/1973 | Ferris | 416/140 |
| 3,853,426 | 12/1974 | Rybicki | 416/140 |

Primary Examiner—Everette A. Powell, Jr.
Attorney, Agent, or Firm—Vernon F. Hauschild; Robert E. Kline

[57] ABSTRACT

A fully articulated helicopter rotor having an elastomeric type main bearing which is reactive of all blade motions about the intersecting blade pitch change, lead-lag, and coning axes, including blade droop supporting and limiting members for static and dynamic operating conditions wherein coupling influences between the separate blade motions are precluded. In reacting these blade weight loadings and dynamic thrust forces, the droop members specifically provide full area contact bearing surfaces to distribute the large forces from the blades into the rotor hub proper while avoiding scuffing or rolling contact between the parts, and the high bearing stresses which would result from either point or line contact only.

11 Claims, 2 Drawing Figures

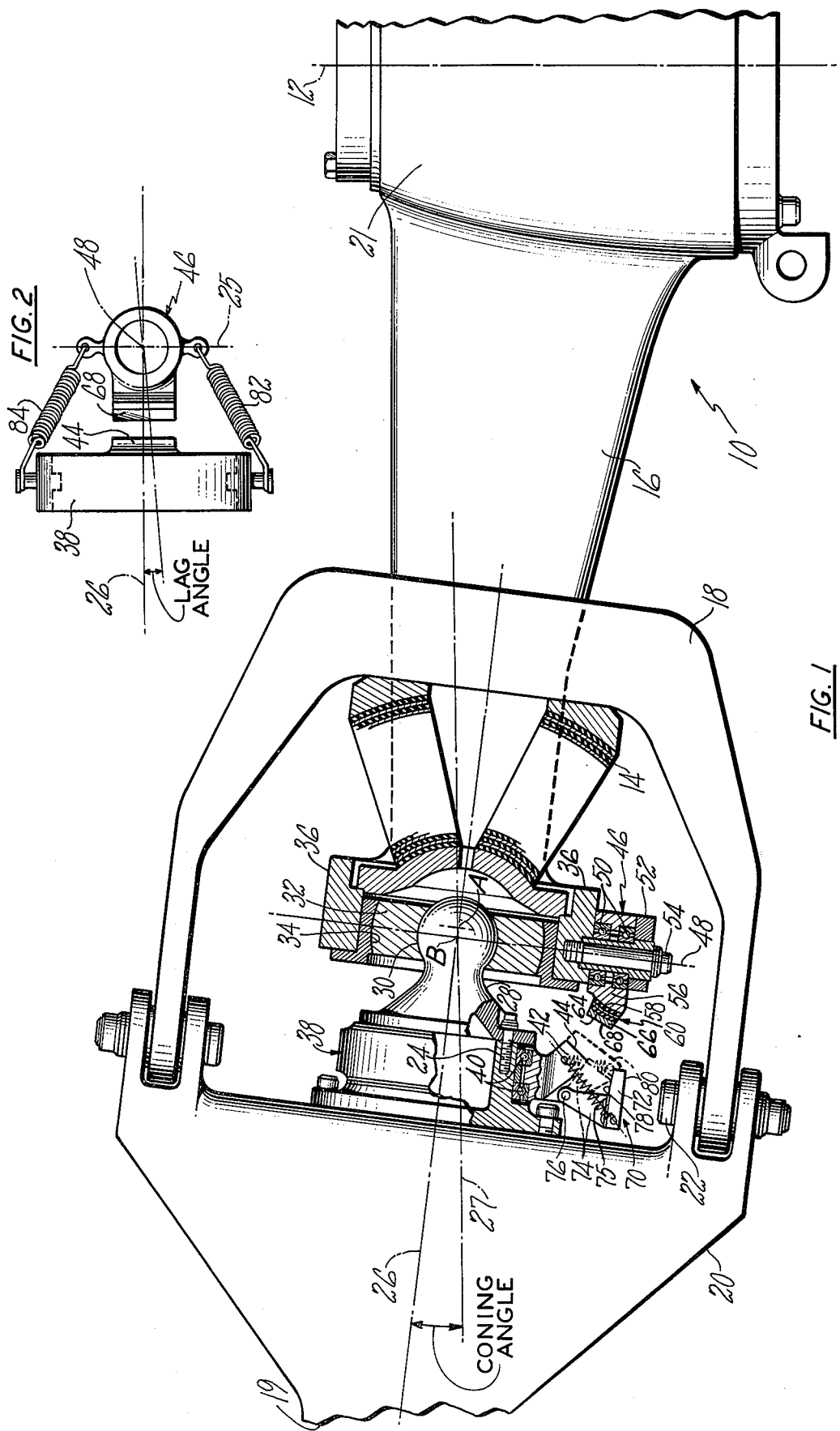

DROOP STOPS FOR HELICOPTER ROTOR HAVING ELASTOMERIC BEARINGS

BACKGROUND OF THE INVENTION

1. Field of Invention

This invention relates to a helicopter rotor head wherein the blades are mounted in a fully articulated manner with three axis support freedom provided by an elastomeric type bearing, or bearings, which react the compound blade deflections and more particularly to a static and dynamic blade droop support and limit stop for use in such a rotor which isolates the droop support mechanisms from the effects of blade excursions in pitch, lead-lag, and flapping such that contact between the droop members not only avoids possible coupling effects but provides continuous full area contacting surfaces between the droop supports in reacting gravity or thrust loadings of the blades.

2. Description of the Prior Art

The droop stop art includes mechanisms that result in full area contact between two abutting surfaces which limit blade downward motions while avoiding coupling effects due to blade pitch change or blade lead-lag. It is significant to note, however, that the type of rotor head to which these prior art mechanisms are adapted is the fully articulated type having multiple and separate means to support the blades from the rotor head in pitch, lead-lag and flapping freedoms. An example of this prior art is assignee's U.S. Pat. No. 2,614,640 to Buivid, which shows mechanism long utilized by the assignee of the instant invention for Sikorsky type helicopters. The droop stop of Buivid comprises an abutment on the underside of the flapping link attached to the rotor blade, and a mating abutment which is an extension of the drag link. The effects of pitch coupling are precluded or isolated by mounting the first abutment inboard of the pitch change or stack bearings (not shown). The effects of lead-lag coupling are precluded by mounting the second abutment outboard of the drag hinge. The flapping hinge is utilized to provide the differential flapping motion between the two abutments.

As an advancement in the helicopter rotor head art, the spherical laminated elastomeric bearing rotor is substituted for the fully articulated rotor head shown in Buivid. The significant feature of this new type of configuration is that the separate support bearings of Buivid for pitch change, lead-lag, and flapping are functionally replaced by a single elastomeric unit, or units in an array. Examples of these two types of elastomeric rotor heads are shown in U.S. Pat. Nos. 3,778,189 to Ferris, and 3,782,854 to Rybicki. Various attempts have been made to provide blade droop support and coning limiting capability to the elastomeric bearing rotor configuration, but heretofore none of these have achieved the full area bearing contact of this invention for all combinations of blade excursions. While it is the basic function of the elastomeric bearing to react all blade motions in a single unit, and thus offer the potential benefit of increased reliability and maintainability of a non-lubricated member, it is this multiple reaction feature that presents the coupling difficulties. The prior art for elastomeric type rotor heads teaches droop support mechanisms which provide point or line contact only between the droop stop contacting members for all combinations of blade motions, or which result in flat bearing area contact for only one specific angle of lead-lag. Of the most pertinent of these prior art patents are the following:

Kisovec U.S. Pat. No. 3,282,350 teaches in its FIGS. 2 and 3 configuration an elastomeric bearing rotor head having full three axis articulation wherein the means to limit rotor blade droop is the contact between a flap stop on the hub and the arcuate portion of the blade. It is notable that the degree of blade droop will be a function of the amount of cyclic pitch imparted to the blade, and that full area contact between the abutting droop members will only occur at a single predetermined pitch angle.

Assignee's Ferris U.S. Pat. No. 3,778,189 provides an improvement over Kisovec wherein the pitch coupling effect is eliminated by the use of droop members shaped to form intersecting cones with their axes specifically located. Such a configuration produces line contact between the members, as pure rolling occurs between them under the various combinations of blade motions when the conical members are in contact. This patent also presents an improvement over the droop limiting mechanism shown in the Mosinskis U.S. Pat. No. 3,501,250, which comprised a hub mounted conical pad and a blade mounted roller and would produce neither pure line rolling contact nor full area bearing contact.

Assignee's U.S. Pat. No. 3,853,426 issued on Dec. 10, 1974 on improvements in "Elastomeric Helicopter Rotor Head with Dynamic and Static Blade Coning and Droop Stops," by R. Rybicki presents an improved droop stop configuration over the Ferris patent wherein both the static and the dynamic mechanisms are supported by the same mounting means and include provisions for misalignment of the main elastomeric bearing without compromise to the line contact between the droop members. Such configuration was successfully incorporated and actually reduced to practice in an H-53 six-bladed Sikorsky helicopter.

The number, size and weight of the blades and rotor are significant factors in the design of droop stop mechanisms, since the loading of the members must not be allowed to produce stresses which would cause failure of the members. Thus, for given weights and loadings, suitable contact surface must be provided on the abutting members, and suitable strength must be provided in their supporting structures. Also, the size and weight of the droop members must be optimum to avoid detrimental drag effects and overweight performance limitations.

This invention provides an improvement over the prior Rybicki application in that it teaches a droop stop configuration which provides full area contact and is adaptable to the full articulation feature of the elastomeric rotor head. For rotor heads in larger sizes and weight than the H-53, such configuration has provided these beneficial weight and stress advantages.

To specify these benefits further, it must be realized that the space envelope available for incorporation of n droop stop members for an n bladed rotor head is generally reduced as the number of blades is increased for larger helicopters, and the blade size and load to be imposed on those stop members will also be increased. Area contact droop members are generally smaller and lighter in weight than line contact members and offer less drag resistance. Thus, the configuration offered by this invention is attractive to the requirements of the stress, weights, and performance engineers. The lack of rolling contact also reduces the need for lubrication.

SUMMARY OF THE INVENTION

For a helicopter rotor head operating at low speed or at rest, wherein the blades are of a flexible configuration and tend to droop at their tips because of their weight from a horizontally extending position, or wherein such flexible or rigid blades are supported from the hub of the rotor in an articulated or free manner, it is possible that such blade droop may result in contact by the blades with the ground and/or the fuselage of the helicopter unless restricted in their downward inclination by suitable means. Further, it is recognized that under full rotational speed of the rotor head, the centrifugal loading of the blades will overcome their gravity loading, and the severe droop restrictions required at rest or low speed will not be required and will actually be a detriment if not adjusted to allow a greater downward angular deflection of the blade. Various motions of the rotor blades, whether at full or low speed, such as abrupt maneuvers in flight or even ground taxiing may cause the blade to reach the safe deflection limit provided by the droop stops. As taught in the prior art referenced heretofore, and especially discussed in the Buivid patent, it is known to provide a blade deflection limiting member called a static stop for use when the rotor is stopped or is rotating slowly, and to prove a second stop, or an adjustment means to the static stop, which is called a dynamic stop for use when the rotor is at a greater or at full speed. It is known to provide the static stop member with both a spring bias to direct it to its low rotor speed droop limiting position and a centrifugally operated counterweight to move the static stop member to a by-pass or non-influencing position when the rotor head is at a higher rotational speed. It is also known generally to provide full area contact surfaces for mating droop stop members as shown in Buivid U.S. Pat. No. 2,614,640 but in rotors which do not generate the coupling effect problems generated by an elastomeric bearing rotor, but it is the primary objective of this invention to apply for the first time the full area contact provision to the elastomeric type main rotor system while avoiding coupling effects in the droop stop. During the earlier development evidenced by the Ferris and Rybicki patents, this objective was felt to be contradictory to the inherent compound motion characteristics of that type main bearing.

To illustrate the function of this invention, a typical sequence is presented. As parked with rotor blades extended, each blade must be limited to a first droop angle, for example, ½° below the horizontal, and each blade will be positioned by its damper/positioner against its lead stop. As the rotor head is engaged by release of the rotor brake, and the rotor hub is driven in the usual counterclockwise direction, the inertia of each blade wanting to remain at rest, causes a blade/rotor hub lag motion to take place until the blade contacts its lag stop and starts to be pulled into rotation with the rotor hub. During this movement the blade will remain on its static droop stop, and may undergo pitch damage as directed by the pilot. The blade static droop angle must not be affected by the above lag motion and pitch change. Further, as full rotational speed is reached and the blade lifts off its static stop, it is desirable that the angular droop restriction be relieved to approximately a 6° angle below the horizontal to allow for greater blade clearance limits during aircraft flight. Thus, the static droop member must automatically shift its position as a function of this speed change, and in a reversible manner. In accordance with this invention, the droop mechanism presented herein meets the requirements within the environment of the elastomeric bearing type rotor head, while providing full area bearing droop stop contact for both the static and dynamic droop members.

In accordance with a further object of this invention, provision is made for the possible misalignment of the elastomeric main bearing as a result of the difference in its outward deflection due to the degree of compression of the rubber laminates caused by the loading of the bearing under the centrifugal force created by rotation of the blade, and radial deflections of the bearing as its laminates move in a shear manner. It is known for example that a blade of a helicopter having a gross weight of approximately 40,000 lbs will compress its elastomeric bearing up to 0.150 inch. Thus, dependent on the rotor's rotational speed and the centrifugal load on the blade, the stop members must be able to accommodate a blade shift outward of from zero to this maximum amount.

In accordance with the teaching of this invention, a first flat abutment or contact pad is rotatably mounted to and concentric with the pitch axis at the inner end of the rotor blade. A second flat abutment or contact pad is rotatably mounted to the rotor hub, and concentric to the lead-lag axis. By means of their bearing mountings, the first pad is isolated from the blade pitch motion, and the second pad is isolated from the hub and is thus free to travel in lead-lag, but not in a flapping direction. A connecting linkage between these two pads will maintain them in proper abutting alignment, such that their respective surfaces will be in position to contact each other fully when the blade droops downward to the predetermined angle of the second pad, regardless of the particular lead-lag angle or pitch angle of the blade.

A third flat abutment or contact pad is pivotally mounted to the first pad by means of a loose pin arrangement. The third pad, when interposed between said first and second pads by a biasing spring, limits the blade droop angle to —½° below the rotor plane, and when centrifugal force increases with faster rotation of the hub member so as to overcome the spring bias the third pad rotates from its interposition permitting increased blade droop limit to —6° below the rotor plane. The loose pin arrangement permits the third pad to transmit blade droop loads from the first pad to the second pad, when interposed as above, without applying these loads to the pivotal mounting.

The misalignment accommodating feature of the droop stop configuration comprises a small portion of a cylindrical elastomeric bearing member incorporated in the hub mounted pad. By the inherent capability of the bearing to sustain shear deflections under high compression loads, this second pad is able to shift laterally to realign itself with the shifting of the blade mounted pad which has been shifted due to the compression or lateral shift of the main bearing or the centering bearing, which may also be of the elastomeric type.

Other objects and advantages of the present invention may be seen by referring to the following description and claims, read in conjunction with the accompanying drawings.

BRIEF DESCRIPTION OF THE DRAWINGS

FIG. 1 is a partial side view of an articulated helicopter rotor head, partially broken away for illustration, which shows a spherical elastomeric main bearing supporting the rotor blade in pitch, lead-lag, and flapping freedoms and with the droop stop members illustrated in the static stop and low rotor speed condition position in phantom line view and in full line in the full rotor speed condition.

FIG. 2 is a plan view of the droop stop members alone and showing tension springs not depicted in FIG. 1.

DESCRIPTION OF THE PREFERRED EMBODIMENT

Referring to FIG. 1 we see a helicopter articulated rotor head 10 of the link or yoke configuration mounted for rotation about axis of rotation 12 and having a spherical elastomeric bearing 14 mounted between its outboard extremity hub arm 16 and the blade yoke 18 to support blade 19 from hub 21 with freedom of motion about intersecting feathering axis 26, lead-lag axis 48, and flapping axis 25. The rotor blade proper is primarily connected to this yoke 18 by its root end cuff attachment 20 by suitable fasteners 22, and also by an inwardly directed stub shaft 24 which is concentric to the blade pitch axis 26 and to which is mounted the centering pin 28 which serves as the inner race 30 for elastomeric centering bearing 32. The outer race 34 of the bearing 32 is supported in the outboard yoke portion 36 of rotor hub arm 16. The function of bearing 14 is to react in compression the centrifugal loads resulting from high speed rotation of the blades, and to react in shear the various compound motions of the blade as it changes its pitch angle both cyclically and collectively, and undergoes several degrees of simultaneous motion in both lead-lag (horizontal) motion about axis 48 and flapping (vertical) motion about axis 25. Since the usual operating flight condition of the main rotor will result in an upward cone of the rotor disc and a slight lag angle for all blades, it may be desirable for stress reasons to install the main bearing 14 such that it will assume a substantially neutral deflection mode under its flight condition. FIG. 1 depicts the bearing in such flight condition, and also shown the centering bearing 36 in its flight condition wherein the compression of the main bearing 14 has allowed the focal point of both bearings to be displaced outward from point A to point B. It is thus from point A that the blade will extend or droop downward in its static or low rotor speed condition, while point B will be its basic or virtual pivot point when under full rotor speed. Due to gust or maneuver conditions, radial loadings on the centering and main bearings may momentarily shift these points off the pitch axis in a radial direction.

Droop stop member 38 is rotationally mounted about the blade stub shaft 24 by bearings 40 concentric to the blade pitch axis 26 and includes a local protrusion 42 having a flat surface area 44. This flat abutment surface 44 is in a transverse plane perpendicular to a plane of the FIG. 1 showing.

Thus mounted, the droop stop member 38 is isolated by means of the bearings 40 from all pitch motions of the blade, but will travel with the blade in lead-lag and flapping excursions. Droop stop contact member 46 is rotationally mounted concentrically to the blade lead-lag axis 48 by bearings 50 which are supported by an extension 52 connected to the yoke portion 36 of the rotor hub arm 16 by bolt 54. Droop member 46 includes a local protrusion 56 having a convex cylindrical outer surface 58 forming the inner race of laminated cylindrical elastomeric element 60, which comprises alternate joined layers of elastomer and metallic shims. Cylindrical concave surface 64 of block 66 forms the outer race of elastomeric element 60, which block is provided with a flat abutment surface 68 forming a transverse plane perpendicular to a plane of the FIG. 1 showing. The center for cylindrical element 60 is located on lead-lag axis 48, and the cylindrical races and metallic layers of the element are tangential to the surface 68. It should be noted that in the FIG. 1 showing of the blade and its attached members in the rotor flight condition, the planes of surfaces 44 and 68 are radially aligned with focal point B. Thus configured, the surfaces 44 and 68 are designed for full area contact when the blade in full flight operation dips downward about point B to the predetermined angular limitation of stop member 46.

A spring biased static droop stop 70 is incorporated to restrict the downward droop of the blade when in a stopped or low rotor speed condition. The static stop 70 includes contact member 72 connected to arms 74 and pivotably supported therefrom by loose fitting pin 76 attached to droop stop member 38. The arms 74 are biased by spring means 75 to urge the stop 70 in a counterclockwise direction as viewed in FIG. 1 until surface 78 contacts surface 44 of stop member 38. In this biased position, the opposed surface 80 of contact member 72 is in alignment to strike surface 68 of droop stop member 46 when the blade droops downward in its low rotor speed condition, and is therefore restricted to a lesser downward droop angle than allowed for dynamic or full rotor speed conditions. To provide for full contact with the surfaces 44 and 68 of droop members 38 and 46, the respective surfaces 78 and 80 are constructed in an angular or radial relationship with the apex at point B, forming a wedge shape, rather than as purely parallel. The loose mounting of the pin 76 in stop member 38, allows droop induced loads to be transmitted directly and fully from the blade to the stop member 46 and thence to the hub arm 16 without imposing severe loads on the arms 74 and pin 76 of the static stop member 70. Contact pad 72 acts also as a centrifugal flyweight, which under the centrifugal loading imposed by full speed rotation of the rotor head, will overcome its spring bias and rotate in a clockwise direction to the stand-by or inoperative position shown in full lines in FIG. 1.

FIG. 2 shows parallel tension springs 82 and 84, each of which have one end attached to the cylindrical portion of stop 38, and their other ends attached to the cylindrical portion of stop 46. The function of these springs is to act as a connecting linkage or scissors to cause stop 46 to follow the lead-lag motion of the blade as it rotates about vertical axis 48, and to cause stop 38 to remain in proper orientation regardless of blade pitch. Under a counterclockwise rotation of the rotor head, FIG. 2 illustrates the aligned orientation of stop contact surfaces 44 and 68 when the related blade is at its slight lag angle as in its flight condition. While dual springs 82 and 84 as shown and described, it is possible to utilize other mechanisms such as a scissors or telescopic mechanism either singly or as a pair. The springs appear preferable because of their simplicity, low weight and avoidance of a lubrication need.

MANNER OF OPERATION OF THE PREFERRED EMBODIMENT

Under full rotational speed of the rotor head 10, where in the centrifugal force imposed on the rotor blades by their weight will compress the elastomer layers of the elastomeric bearing 14, a pivot or blade focal point will be established at point B of FIG. 1, on the pitch axis 26. In the elastomeric type rotor head shown, wherein a centering bearing 32 also of the laminated elastomeric type is utilized, it is recognized that both bearings 14 and 32 will allow slight radial deflections or excursions of this pivot eccentric to the pitch change axis 26 as well as the aforementioned shift along this axis from point A to B. This is a feature inherent and unique to the elastomeric bearing type rotor head. Should the helicopter pilot attempt an abrupt maneuver which requires a large cyclic input into the rotor head, the downward extension of each blade as it reacts to this input will occasionally reach, and tend to go beyond, a predetermined low angular limit. This angular limit is defined by the angle from point B established between the surfaces 44 of stop 38 and surface 68 of stop 46. Generally, such angle will be on the order of 6° from a horizontal reference plane 27. With the rotor head at flight speed, and due to the inertia of the blades, each blade will be in a slight angular lag position as measured from pivot point B wherein the degree of lag depends on whether the blade is in the advancing or retreating section of the azimuth, and the magnitude of its angle of attack as measured from a flat pitch position. It may be recognized therefore that at any instant, each blade of the rotor system may be at a different pitch angle, lead-lag angle, and flapping angle. In limiting blade droop excursions to a predetermined angle, the droop stop mechanisms shown will not interfere with the pitch or lead-lag tendencies of the blade, and the springs 82 and 84 will align the droop stop contact members 38 and 46 regardless of the lead-lag and pitch position of the blade. When the blade mounted droop stop member 38 bottoms against hub mounted droop stop 46 with the blade pivot at point B, a full load transfer is made by surface contact of the two abutting members. Line or point contact, which would otherwise create a damaging high stress condition which could precipitate a failure of the stop members, is thus avoided.

It is thus important for large helicopter rotor heads that such area contact droop stops be utilized, and it is to this object that this invention is primarily addressed. In the rotor head configuration shown, the centering bearing 32 will react the blade radial load, which is a function of the blade mass, its inertia, and the distance from its center of gravity to its contact point as measured along the blade span. In reacting this load at point B, and due to the resilient nature of the elastomeric centering bearing, point B will initially shift radially away from its depicted location on the pitch axis 26. This shift at the blade pivot point will result in an angular shift of the surface 44 of blade mounted stop member 38.

The use of the additional elastomeric element 60 adjacent the contact surface 68 of stop member 46 will allow block 66 to shift through shear of its elastomer layers such that its flat contact surface 68 will follow the shifted motion of mating stop member 38, and surface contact will be maintained. As the load is dissipated or removed, and the blade pivot returns to its location B on the pitch axis, the element 60 will return to its own neutral position under the influence of the forces at the contact surfaces.

When the rotor is at rest or at low rotational speed, the static droop stop 70 will be positioned by springs 75 such that its contact member is interposed between contact members 38 and 46. Due to the relief of the centrifugal load from bearings 14 and 32, the blade pivot will approach point A. Contact between stops 38, 70 and 46 may produce an initial misalignment and shift of the pivot from point A. In the manner described above, such misalignment will cause a shear motion in the elastomeric element 60 which will allow block 66 to shift such that all flat surfaces will remain in full surface contact. Similarly to the action involving the dynamic stop only, the blade pivot will return to its location on the pitch axis and the element 60 will return to its vertical position as the load is dissipated.

While blade motions have been described as relating to the elastomeric centering bearing 32, it should be noted that motions of the main bearing 14 may cause misalignment problems that are also accommodated by the shifting motions allowed by elastomeric element 60. In similar fashion, the area contact droop stop as applied to the elastomeric rotor head is equally adaptable to those elastomeric bearing rotor heads which do not utilize a centering bearing as shown in FIG. 1. Such a rotor head is illustrated by Rybicki Pat. No. 3,782,854.

When the helicopter lands and the engines are shut down, the rotor head first slows to a reduced speed by normal decay of its energy; and then the application of the conventional rotor brake (not shown) will bring the blades to a stop. During the high speed rotation of the rotor head, the weight of static stop member 72 will be acted upon by the centrifugal force due to its rotational motion, and it will assume the full line position shown in FIG. 1. Upon reduction of this centrifugal force below the force imposed in the opposite direction by spring 27 at pivot pin 76, the stop member or wedge 72 will be rotated by the spring 27 into its phantom line position shown in FIG. 1. As a further reduction of centrifugal force is made, and the gravity pull of the blade becomes dominant, and collective pitch inputs are reduced, the blade will droop downward from its root end pivot attachment. Droop stop member 38 with its static stop member 72 in contact, will strike droop stop member 46 and thus prevent further downward extension. Due to the instant eccentricity of the pivot point normally at A as a function of a centrifugal force decay, vibration, or other reactionary factors, a slight misalignment between contact surfaces 80 and 68 may be present, and will result in the initial contact being a line contact. This happening is momentary, however, since full area contact will quickly be established by the application of light loads as a function of the interrelationship of the three elastomeric bearings 60, 32 and 14 working together to relocate the blade pivot point back at its point A position.

While this invention has been described as a droop stop or droop limiting mechanism, it must be realized that the configuration presented can be used equally as well to limit rotor blade flapping or upward coning excursions as well. Likewise, while it is generally desirable to utilize secondary members to restrict blade droop to a lesser angular degree in a low speed or stopped rotor condition, it is desirable to provide the same type of adjustable function to flapping stop mechanisms. Since blade droop is a more severe condition than blade flapping, a flat pad droop stop providing a full area contact may be used on the same rotor head as a conical shaped flapping stop which merely provides line contact.

I wish it to be understood that I do not desire to be limited to the exact details of construction shown and described, for obvious modifications will occur to a person skilled in the art.

I claim:

1. Droop stop mechanism for a helicopter rotor head of the type wherein each blade is supported for motion about intersecting pitch, lead-lag, and flapping axes by an elastomeric type bearing mounted between the rotor hub and the blade root attachment comprising:
   A. a first support member rotatably mounted to the blade root attachment by bearing means concentric to the pitch axis, including a first flat abutment surface in radial alignment with the pivot of the blade,
   B. a second support member rotatably mounted to the rotor hub by bearing means concentric to the rotor head lead-lag axis so as to be engaged by the first support member, including a second flat abutment surface in radial alignment with the pivot of the blade, and
   C. alignment means connecting said first and second support members.

2. Droop stop mechanism according to claim 1 wherein said second support member includes a laminated cylindrical elastomeric element having alternate layers of elastomer and metallic discs.

3. Droop stop mechanism according to claim 2 wherein said cylindrical elastomeric bearing discs are tangential to said second flat abutment surface and concentric with the rotational axis of the second support member.

4. Droop stop mechanism according to claim 1 wherein said alignment linkage connecting said first and second support members comprises a pair of coil spring tension members.

5. Droop stop mechanism according to claim 1 and including a centrifugally responsive static stop means pivotally mounted to said first support member and including a wedge shaped contact pad having flat opposed surfaces adapted to engage the first and second flat abutment surfaces, respectively, and spring means to cause rotation of said static stop means to a position wherein one of said pad surfaces is brought into mating engagement with the first flat abutment surface of said first blade mounted support member and wherein the other of said pad surfaces will abut said second flat abutment surface when the blade is in full droop position.

6. Droop stop mechanism for a helicopter rotor head having a blade mounted from a hub by means of an elastomeric bearing for freedom of motion about intersecting pitch change, flapping, and lead-lag axes including:
   A. a first support member rotatably mounted to the blade concentric to the pitch axis and having a first flat abutment surface in alignment with the pivot point of said blade,
   B. a second support member rotatably mounted to the hub concentric to the lead-lag axis and having second flat abutment surface in alignment with the pivot point of said blade and positioned to engage said first flat abutment surface during droop excursions of said blade during rotation of said rotor head above a predetermined speed to support said blade and thus limiting said blade droop travel to a maximum angle,
   C. alignment linkage connecting said first and second support members and adapted during blade lead-lag motions to rotate said second support member relative to the hub through a corresponding lead-lag motion so as to maintain said first and second abutment surfaces in alignment.

7. Droop stop mechanism according to claim 6 wherein said second support member includes an elastomeric element having alternate layers of elastomer and metal discs.

8. Droop stop mechanism for a helicopter rotor head of the type wherein each blade is supported for pitch, lead-lag, and flapping motions by an elastomeric type bearing mounted between the rotor hub and the blade comprising:
   A. a first support member attached to the blade by mounting means adapted to isolate said first support member from blade pitch change motion, and including a first flat abutment surface,
   B. a second support member attached to the hub by mounting means adapted to allow blade lead-lag motion relative to said hub, while isolating said second support member from blade pitch change and blade flap motion and including a second flat abutment surface adapted to abut said first flat abutment surface to limit blade droop, and
   C. alignment linkage connecting said first and second support members so as to align said first and second abutment surfaces.

9. Droop stop mechanism according to claim 8 wherein said second support member includes a laminated cylindrical elastomeric element having alternate layers of elastomer and metallic discs.

10. A helicopter rotor having:
   1. a hub mounted for rotation about an axis of rotation,
   2. at least one blade projecting substantially radially outwardly from said hub,
   3. bearing means supporting said blade from said hub for freedom of motion about the blade pitch change, lead-lag and flapping intersecting axes,
   4. a first support member connected to the blade concentrically about the pitch change axis and for flapping motion therewith and having a first flat abutment surface in alignment with the blade pivot point,
   5. means supporting said first support member from said blade so that the first support member is isolated from blade pitch change motions,
   6. a second support member connected to said hub concentrically about the lead-lag axis and having a second flat abutment surface in alignment with the blade pivot point and positioned to engage said first flat abutment surface during droop excursions of said blade so that said first and second support members cooperate to act as a droop stop to limit the blade droop travel,
   5. means to support said second support member from said hub so that it is isolated from said hub during hub lead-lag excursions,
   6. first means to cause said first and second flap abutment surfaces to remain in alignment, and
   7. second means to cause said first and second flat abutment surfaces to remain in alignment.

11. A rotor according to claim 10 and including a member pivotally connected to said first support member and operable between a first position wherein it is positioned between said first and second flat abutment surfaces during rotor low speed and stop condition so as to reduce the blade droop limit, and a second position free of said first and second flat abutment surfaces during rotor high speed operation to permit maximum blade droop motion before said first and second flat abutment surfaces contact in droop-stop fashion.

* * * * *